(12) United States Patent
Ge et al.

(10) Patent No.: US 7,492,708 B2
(45) Date of Patent: Feb. 17, 2009

(54) TRAFFIC BALANCING APPARATUS AND METHOD, AND NETWORK FORWARDING APPARATUS AND METHOD USING THE SAME

(75) Inventors: Yi Ge, Beijing (CN); Dan Li, Beijing (CN); Zhiyong Liang, Beijing (CN); Yonghua Lin, Beijing (CN); Yan Qi Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 11/393,968

(22) Filed: Mar. 30, 2006

(65) Prior Publication Data

US 2006/0233175 A1    Oct. 19, 2006

(30) Foreign Application Priority Data

Mar. 30, 2005   (CN) .................. 2005 1 0059596

(51) Int. Cl.
*H04J 3/14*   (2006.01)
*H04J 3/16*   (2006.01)
*G08C 15/00*  (2006.01)

(52) U.S. Cl. .................. 370/229; 370/401; 370/466
(58) Field of Classification Search .............. None
See application file for complete search history.

(56) References Cited

U.S. PATENT DOCUMENTS

| 7,231,452 | B2 * | 6/2007 | Ananda et al. | 709/230 |
| 2003/0161313 | A1 * | 8/2003 | Jinmei et al. | 370/392 |
| 2004/0131079 | A1 * | 7/2004 | Hegde et al. | 370/466 |

* cited by examiner

*Primary Examiner*—Wing F Chan
*Assistant Examiner*—Marcus R Smith
(74) *Attorney, Agent, or Firm*—Lisa M. Yamonaco; Anne Vachon Dougherty

(57) ABSTRACT

The present invention reduces the burden of the network having heavier load, maintains the load balance among different networks, and improves the overall resource utilization efficiency and transmission qualities of the networks, by providing a network forwarding apparatus for selectively distributing the IP packets to be forwarded to the network having less traffic for transmission by monitoring in real-time the traffic in the different networks.

1 Claim, 21 Drawing Sheets

Fig. 7

| Dest. Subnet 701 | Tunnel Next hop (NH) 705 | Score 710 | Priority 715 |
|---|---|---|---|
| IPv4 address of subnet 2 | IPv6 NH address of T1 | (7, 0.9) | 1 |
| IPv4 address of subnet 2 | IPv6 NH address of T2 | (8, 1.1) | 2 |
| | | | |
| ... | ... | | |

Tunnel Managing Table

| Dest. Subnet | Next hop (NH) | Score | Priority |
|---|---|---|---|
| IPv4 address of subnet 2 | IPv6 NH address of T1 | (7,0.9) | 1 |
| IPv4 address of subnet 2 | IPv6 NH address of T2 | (8,1.1) | 2 |
| ... | | | |

Fig. 8A

IPv4 routing table

| Dest. Subnet | Routing entries |
|---|---|
| IPv4 address of subnet 2 | Entry for Direct path1 |
| IPv4 address of subnet 2 | Entry for Direct path2 |
| IPv4 adress of subnet 3 | Entry for Direct path1 |
| IPv4 address of subnet 2 | Entry for Tunnel path1 |
| ... | |

Fig. 8B

IPv4 Forwarding Table

| Dest. Subnet | Next hop |
|---|---|
| IPv4 address of subnet 2 | IPv4 NH address of D1 |
| IPv4 adress of subnet 3 | IPv4 NH address of D1 |
| ... | ... |

Fig. 8C

IPv4 Forwarding Table

| Dest. Subnet | Next hop |
|---|---|
| IPv4 address of subnet 2 | IPv6 tunnel ID of T1 |
| IPv4 adress of subnet 3 | IPv4 NH address of D1 |
| ... | ... |

Fig. 8D

Fig. 12A  Tunnel Managing Table

| Dest. Subnet | Next hop (NH) | Score | Priority |
|---|---|---|---|
| IPv4 address of subnet 2 | IPv6 NH address of T1 | (7,0,9) | 1 |
| IPv4 address of subnet 2 | IPv6 NH address of T2 | (8,1,1) | 2 |
| ... | ... | | |

Fig. 12B  IPv4 routing table

| Dest. Subnet | Routing entries |
|---|---|
| IPv4 address of subnet 2 | Entry for Direct path1 |
| IPv4 address of subnet 2 | Entry for Direct path2 |
| IPv4 address of subnet 3 | Entry for Direct path1 |
| IPv4 address of subnet 2 | Entry for Tunnel path1 |
| ... | ... |

Fig. 12C  IPv4 Forwarding Table

| Dest. Subnet | Multi-hop enable bit | Next hop1 | Next hop2 | Next hop3 |
|---|---|---|---|---|
| IPv4 address of subnet 2 | 0 | IPv4 NH address of D2 | IPv4 NH address of D2 | IPv6 tunnel ID of T1 |
| IPv4 address of subnet 2 | 0 | IPv4 NH address of D2 | IPv6 tunnel ID of T1 | |
| ... | ... | ... | | |

Fig. 12D  IPv4 Forwarding Table

| Dest. Subnet | Multi-hop enable bit | Next hop1 | Next hop2 | Next hop3 |
|---|---|---|---|---|
| IPv4 address of subnet 2 | 1 | IPv4 NH address of D2 | IPv4 NH address of D2 | IPv6 tunnel ID of T1 |
| IPv4 address of subnet 2 | 1 | IPv4 NH address of D2 | IPv6 tunnel ID of T1 | |
| ... | ... | ... | | |

TRAFFIC BALANCING APPARATUS AND METHOD, AND NETWORK FORWARDING APPARATUS AND METHOD USING THE SAME

FIELD OF THE INVENTION

The present invention relates to a traffic balancing apparatus and method for balancing traffic in different networks interconnected with each other, and a network forwarding apparatus and method using the same, and more particularly, to a traffic balancing apparatus and method for balancing traffic among networks employing different IP protocols, and a network forwarding apparatus and method using the same.

BACKGROUND OF THE INVENTION

With the increasing expansion of the Internet, existing IPv4 addresses composing of 32 bits are becoming not sufficient. Accordingly, the IPv6 protocol employing an IP address of 128 bits has been proposed to thoroughly solve the problem of insufficiency of the IPv4 addresses and to make significant improvements on address capacity, security, network management, mobility and quality of service, etc.

Before the IPv6 protocol becomes the main-stream protocol, the IPv4 protocol will be continuously used, thus the coexistence of the IPv4 network and the IPv6 network occurs. In addition, due to imbalance of address allocation, some countries or regions still have enough IPv4 address space for allocation, and the IPv4 network will exist in these countries and regions for a long time. In the predictable future, the IPv4 network and the IPv6 network will coexist for a long time.

The international Internet Engineering Task Force (IETF) has established a specialized NGTRANS (Next Generation Transition) working group to study the problem of IPv4/IPv6 transition and efficient seamless intercommunication. Various transition technologies and intercommunication approaches have been developed at present. One of the typical transition technologies is a dual protocol stack technology. The dual protocol stack technology is the most direct way to make IPv6 nodes compatible with IPv4 nodes, and the objects to be applied comprise communication nodes such as hosts and routers. FIG. 1 shows a system intercommunicating by means of dual protocol stack. An IPv6 protocol stack may be used when an IPv6 node supporting the dual stack protocol is intercommunicating with another IPv6 node, while an IPv4 protocol stack may be used when the IPv6 node is intercommunicating with an IPv4 node. At present, the RFC definitions and the JDK in Java technique use static methods to selectively use an IPv4 or IPv6 address of the destination address. There are the following problems in the above two methods: once a transmitting party transmits, for example, an IPv4 packet, the area through which the packet is transmitted is fixed onto the IPv4 network. In addition, although a host can support the dual stack, the existing RFCs prescribe that priorities of IPv4 and IPv6 are statically set in the dual stack. For example, if it is prescribed that IPv4 has higher priority than IPv6, all the transmitted packets will be IPv4 packets, and the large amount of the IPv4 packets will be forwarded via an IPv4 backbone network. Thus, the situation where the IPv4 network is quite busy while the waste of IPv6 network resource is wasted might occur, and vice versa.

In the prior art, in order to solve the intercommunication problem between the IPv4 network and the IPv6 network, a tunneling technology is also used as the alternative technology for transition from the IPv4 network to the IPv6 network. FIG. 2 is a schematic diagram showing the prior art in which the networks are intercommunicated by means of the tunneling technology. In the tunneling technology, when an IPv6 node C accesses an IPv6 node D, a 6 over 4 IP packet is formed, and then is transmitted through a router X to a router Y via an IPv4 network. the router Y removes the header of the IPv4 packet, and transmits the IPv6 packet to the IPv6 node D via an IPv6 network. Therefore, the IPv6 packet can be transmitted over the IPv4 network by forming an IPv6 tunneling path for transmitting the IPv6 packet between the routers X and Y. However, in the above methods, bandwidth and router resource will be competed between IPv4 traffic and IPv6 traffic.

Therefore, the prior art cannot dynamically select the network with less traffic for transmitting information, based on the traffic in the current networks to efficiently utilize the network resources. Especially, when the traffic in the IPv4 network is too heavy while the traffic in the IPv6 network is very light, or vice versa, the prior art cannot make adjustment in real time on the traffic between the two networks to improve the utilization imbalance between the two kinds of networks.

SUMMARY OF THE INVENTION

To solve the above problems in the prior art, an object of the present invention is to provide a traffic balancing apparatus for dynamically balancing network traffic among different networks employing different IP protocols.

Another object of the invention is to provide a traffic balancing method for dynamically balancing network traffic among different networks employing different IP protocols.

Another object of the invention is to provide a network forwarding apparatus for dynamically balancing network traffic among different networks by determining different forwarding routes for the IP packets to be forwarded based on the traffic in the different networks.

A further object of the invention is to provide a network forwarding method for dynamically balancing network traffic among different networks by determining different forwarding routes for the IP packets to be forwarded based on the traffic in the different networks.

In order to achieve the above objects, the present invention provides a network forwarding apparatus for forwarding IP packets in different networks employing two or more than two IP protocols, the network forwarding apparatus supporting the two or more than two IP protocols and holding a routing table for storing routing information employing one of the IP protocols as a direct path toward a destination address, characterized in that the network forwarding apparatus comprises a traffic balancing part and a forwarding part, wherein the traffic balancing part comprises a tunnel managing part for determining, for the destination address employing the one of the IP protocols in the routing table of said network forwarding apparatus, one or more routing information employing other IP protocols, as tunnel paths toward the destination address; a traffic monitoring part for monitoring traffic in said different networks; a path determining part for determining, for the IP packet to be forwarded containing the destination address, a forward path from said direct path and said tunnel paths, to balance the traffic among said different networks, when said traffic monitoring part judges that traffic imbalance occurs among said different networks, and the forwarding part comprises encapsulating means for converting the IP packet to be forwarded into the packet of the IP protocol employed by the determined forwarding path, when the IP protocol employed by the forwarding path determined by the path determining part is different from the IP protocol employed by the IP packet to be forwarded.

The present invention provides an IP packet forwarding method performed in a network forwarding apparatus for forwarding IP packets in different networks employing two or more than two IP protocols, the network forwarding apparatus supporting the two or more than two IP protocols and holding a routing table for storing routing information employing one of the IP protocols as a direct path toward a destination address, characterized in that the IP packet forwarding method comprises the steps of: determining, for the destination address employing the one of the IP protocols in the routing table of said network forwarding apparatus, one or more routing information employing other IP protocols, as tunnel paths toward the destination address; monitoring traffic in said different networks to judge whether the traffic among said different networks is balanced or not; determining, for the IP packet to be forwarded containing the destination address, a forward path from said direct path and said tunnel paths, to balance the traffic among said different networks, when it is judged that traffic imbalance occurs among the different networks, and converting the IP packet to be forwarded into the packet of the IP protocol employed by the determined forwarding path, when the IP protocol employed by the determined forwarding path is different from the IP protocol employed by the IP packet to be forwarded.

The present invention provides a traffic balancing apparatus for traffic balancing among different networks employing two or more than two IP protocols, the traffic balancing apparatus supporting a network forwarding apparatus employing the two or more than two IP protocols, the network forwarding apparatus holding a routing table for storing routing information as a direct path towards a destination address, characterized in that the traffic balancing apparatus comprises a tunnel managing part for determining, for the destination address employing the one of the IP protocols in the routing table of said network forwarding apparatus, one or more routing information employing other IP protocols, as tunnel paths toward the destination address; a traffic monitoring part for monitoring traffic in said different networks; a path determining part for determining, for the IP packet to be forwarded containing the destination address, a forward path from said direct path and said tunnel paths, to balance the traffic among said different networks, when said traffic monitoring part judges that traffic imbalance occurs among said different networks.

The present invention provides a traffic balancing method performed in a network forwarding apparatus for forwarding IP packets in different networks employing two or more than two IP protocols, the network forwarding apparatus supporting the two or more than two IP protocols and holding a routing table for storing routing information employing one of the IP protocols as a direct path toward a destination address, characterized in that the traffic balancing method comprises the steps of: determining, for the destination address employing the one of the IP protocols in the routing table of said network forwarding apparatus, one or more routing information employing other IP protocols, as tunnel paths toward the destination address; monitoring traffic in said different networks to judge whether the traffic among said different networks is balanced or not; determining, for the IP packet to be forwarded containing the destination address, a forward path from said direct path and said tunnel paths, to balance the traffic among said different networks, when it is judged that traffic imbalance occurs among the different networks.

One advantage of the present invention is in that the burden of the network having heavier load can be reduced, balance of the loads of different networks can be maintained, and the overall resource utilization efficiency and transmission quality of the networks can be improved, by monitoring in real-time the traffic in different networks, and selectively distributing the IP packets to be forwarded to the network with less traffic for transmission.

Another advantage of the present invention is in that the invention will not affect other routing applications while optimizing the network resources, since the present invention only performs operations on the routing table or the forwarding table without changing existing routing protocols.

A further advantage of the present invention is in that balance of network resources can be easily realized at lower cost, since the invention is only used in the network forwarding apparatus for forwarding packets without affecting other structures of existing networks.

BRIEF DESCRIPTION OF THE DRAWINGS

These and other advantages of the present invention will become more apparent from the following detailed description of the preferred embodiments of the present invention taken in conjunction with the appended drawings.

FIG. 7 shows the table structure of a tunnel managing table 601 according to the present invention.

FIG. 8A shows a tunnel managing table according to the first embodiment of the present invention.

FIG. 8B shows an IPv4 routing table according to the first embodiment of the present invention.

FIG. 8C shows an IPv4 forwarding table according to the first embodiment of the present invention.

FIG. 8D shows an IPv4 forwarding table after being traffic balanced according to the first embodiment of the present invention.

FIG. 12A shows a tunnel managing table according to the second embodiment of the present invention.

FIG. 12B shows an IPv4 routing table according to the second embodiment of the present invention.

FIG. 12C shows an IPv4 forwarding table according to the second embodiment of the present invention.

FIG. 12D shows an IPv4 forwarding table according to the second embodiment of the present invention.

DETAILED DESCRIPTION OF THE PREFERRED EMBODIMENT

For the convenience of illustration, taken networks and routers under the IPv4 protocol and the IPv6 protocol as examples, the present invention is now described. However, the present invention is not limited to the networks under the IPv4 protocol and the IPv6 protocol, and can be applied to any network and forwarding apparatus employing IP protocols.

Figure 1:
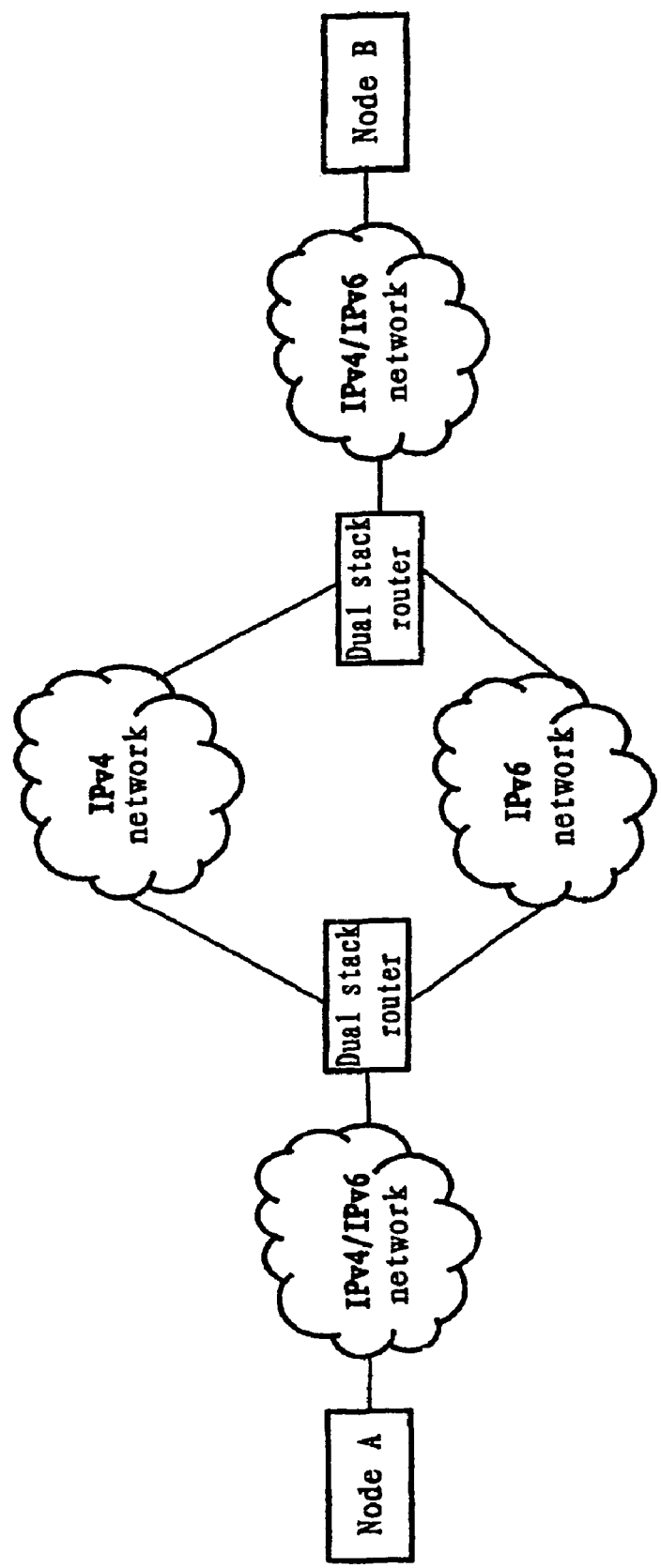
FIG. 1 is a schematic diagram showing the dual stack protocol technology in the prior art.
Figure 2:
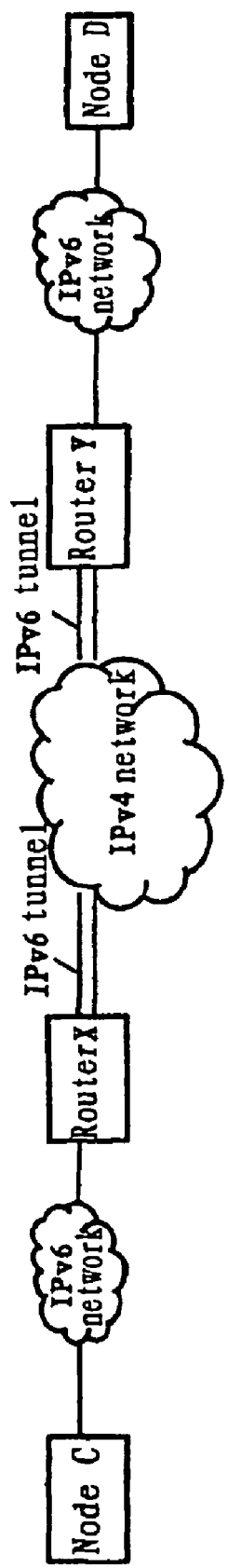
FIG. 2 is a schematic diagram showing the tunneling technology in the prior art.
Figure 3A:
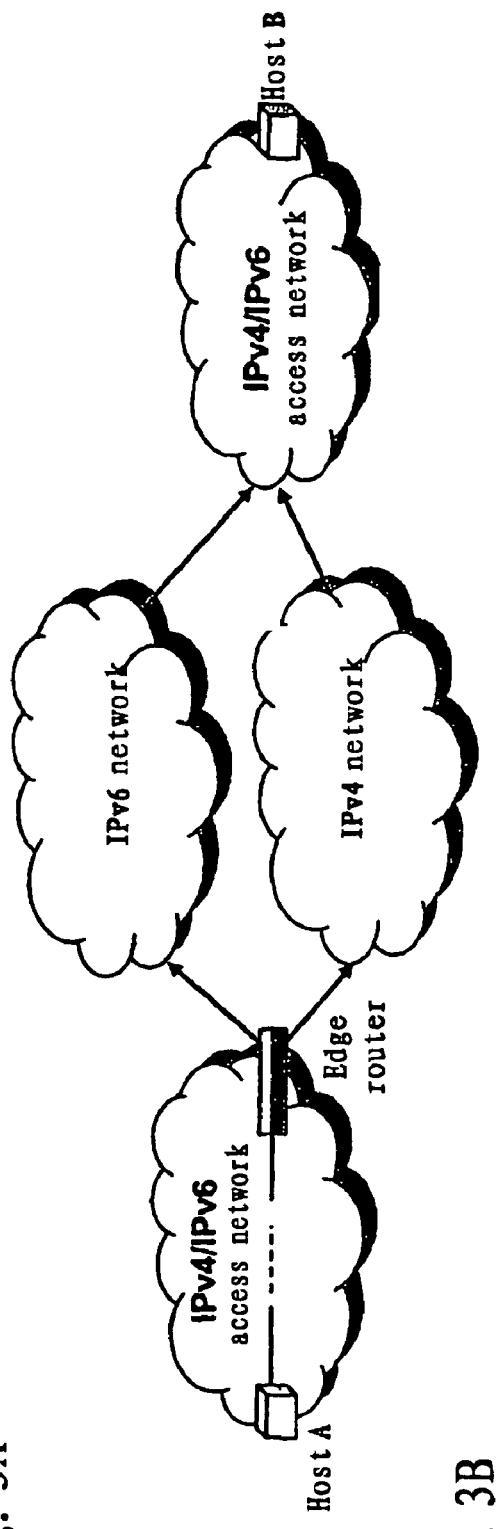
FIGS. 3A and 3B show the network application environment of the present invention.
Figure 3B:
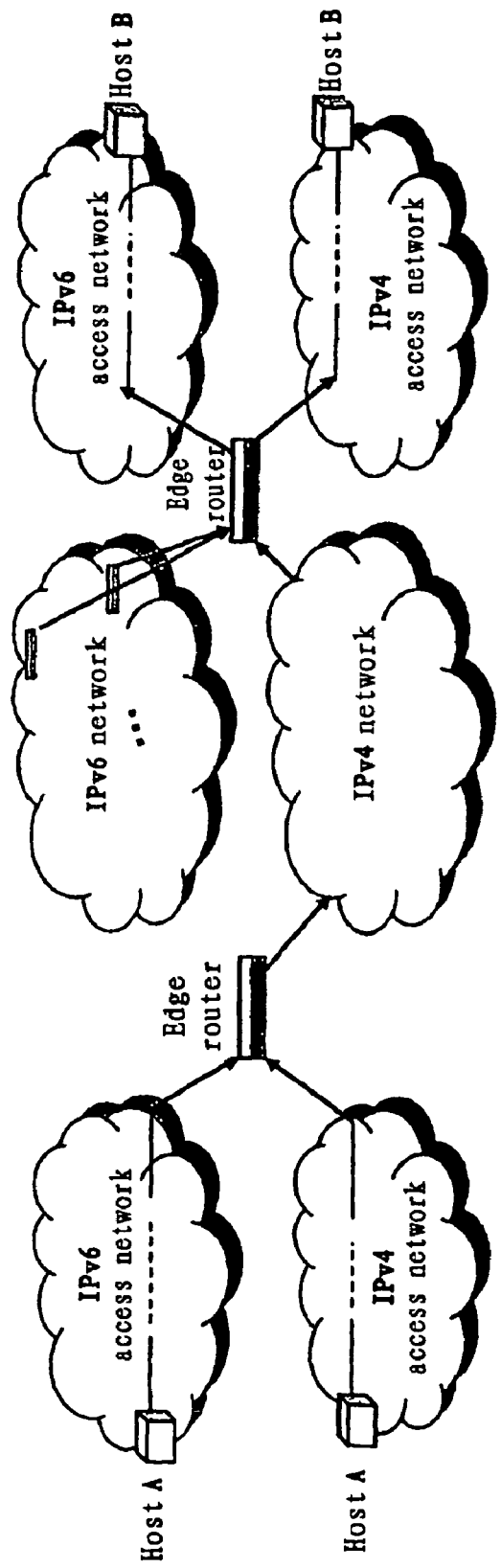

FIGS. 3A and 3B show the network application environment of the present invention.

The edge router in the present invention is a router which is located at the edge of a network and supports both the IPv4 protocol and the IPv6 protocol. The edge router determines the next hop address for the IP packets from a host A, based on the current traffic in the IPv4 network and the IPv6 network.

Figure 4:
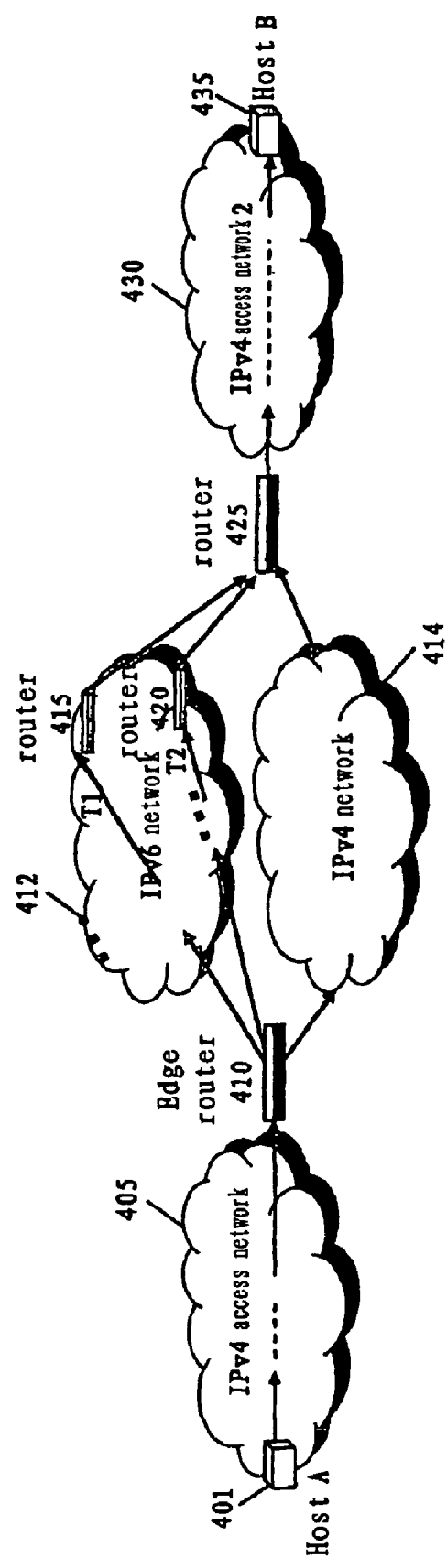
FIG. 4 is an outlined view showing the principle of the present invention.

FIG. 4 is an outlined view showing the principle of the present invention. It is assumed that an IPv4 host A401 transmits an IPv4 packet to an IPv4 host B435.

In the prior art, an edge router 410 either forwards the IPv4 packet to the IPv4 host B435 via an IPv4 network 414, or forwards the IPv4 packet to the IPv4 host B435 via an IPv6 network 412 using the tunneling technology. In the prior art, the IP protocol to be employed for routing is fixed in advance for the edge router 410. For example, if it is prescribed in advance that the IPv4 protocol is used for routing IPv4 packets, the edge router 410 can only make selection from the forwarding routers employing the IPv4 protocol when selecting the next hop. On the other hand, if it is prescribed in advance that the IPv6 tunneling technology is used for routing IPv4 packets, the edge router 410 can only make selection from the forwarding routers employing the IPv6 protocol, for example, routers 415 and 420, when selecting the next hop.

According to the present invention, when the edge router 410 forwards the IPv4 packet, it considers not only the route passing through the IPv4 network 414, but also the route passing through the IPv6 network 412, and determines the next hop based on the relationship between the traffic from the edge router 410 to the IPv4 network 414 and the traffic from the edge router 410 to the IPv6 network 412, both of which are detected in real time. For the convenience of illustration, the route using the same protocol as that of the packets to be forwarded is hereinafter referred to as a direct path, and the route using a protocol different from that of the packets to be forwarded is hereinafter referred to as a tunnel path.

For example, in FIG. 4, T1 and T2 are two tunnel paths for transmitting IPv4 packets via the IPv6 network 412, and the path for transmitting IPv4 packet via the IPv4 network is called a direct path.

Figure 5:
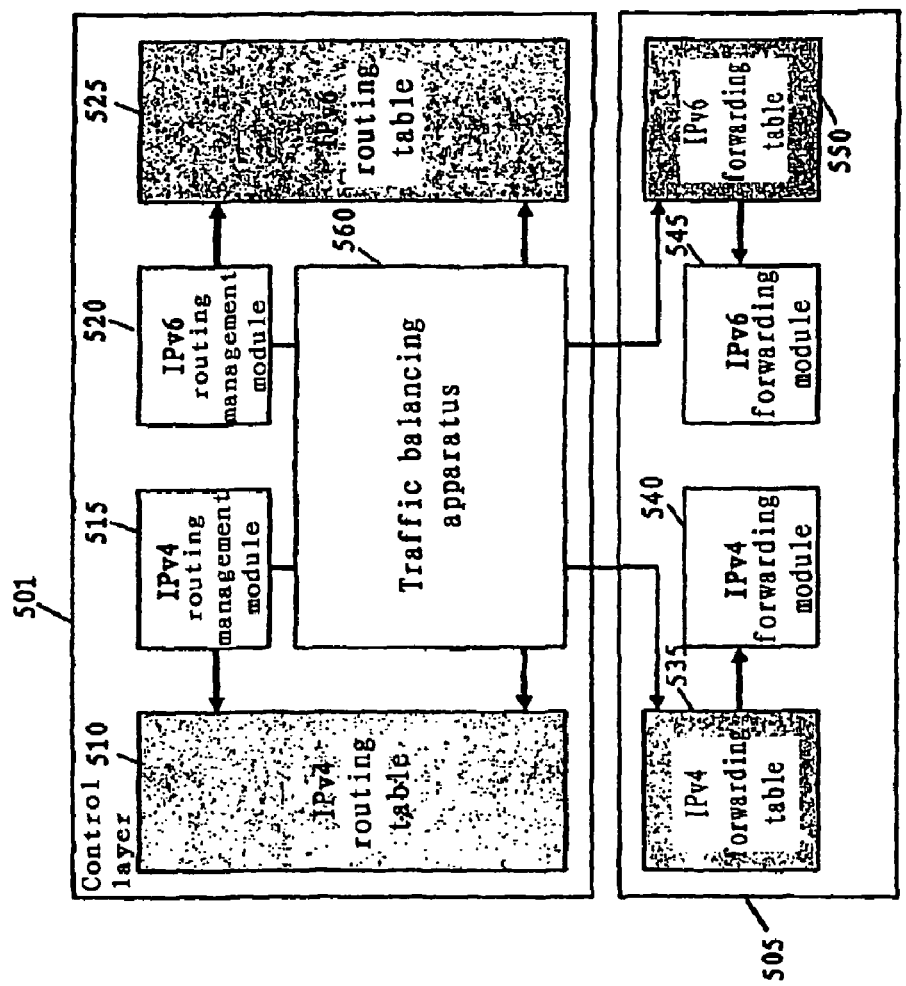
FIG. 5 is a schematic diagram showing an edge router according to the present invention.

FIG. 5 is a schematic diagram showing an edge router according to the present invention. The edge router is a dual stack edge router. The function of the edge router is mainly divided into two portions: a control layer 501 and a data layer 505.

FIG. 5 shows the structure for managing and forwarding existing IPv4/IPv6 routes by the edge router. The control layer 501 stores an IPv4 routing table 510 and an IPv6 routing table 525, both of which hold data relating to the transmission paths for use in routing. The data layer 505 stores an IPv4 forwarding table 535 and an IPv6 forwarding table 550. The IPv4 forwarding table 535 and the IPv6 forwarding table 550 are generated based on the IPv4 routing table 510 and the IPv6 routing table 525, respectively. The forwarding table has a format different from that of the routing table, and is more suitable for fast lookup. The forwarding table and the routing table will be described in detail later.

In the control layer 501, an IPv4 routing management module 515 and an IPv6 routing management module 520 are responsible for the management of the IPv4 routing table 510 and the IPv6 routing table 525, respectively. In the data layer 505, an IPv4 forwarding module 540 and an IPv6 forwarding module 545 perform data forwarding by using the information provided by the IPv4 forwarding table 535 and the IPv6 forwarding table 550. It should be noted that, in existing router structure, two sets of routing management mechanisms that are completely independent from each other are used for IPv4 and IPv6, which have not any interaction of routing information and then have not any intercrossed routes between them.

In order to achieve dynamic switch between an IPv4 route and an IPv6 route in the existing edge router based on the traffic in the IPv4 network and the traffic in the IPv6 network, a traffic balancing apparatus is added in the control layer 501 in the present invention, which efficiently adjusts the distribution between IPv4/IPv6 traffic to solve the problem of traffic imbalance by using the existing routing table. The structure and operation of the traffic balancing apparatus of the present invention will be described in detail below.

Figure 6:
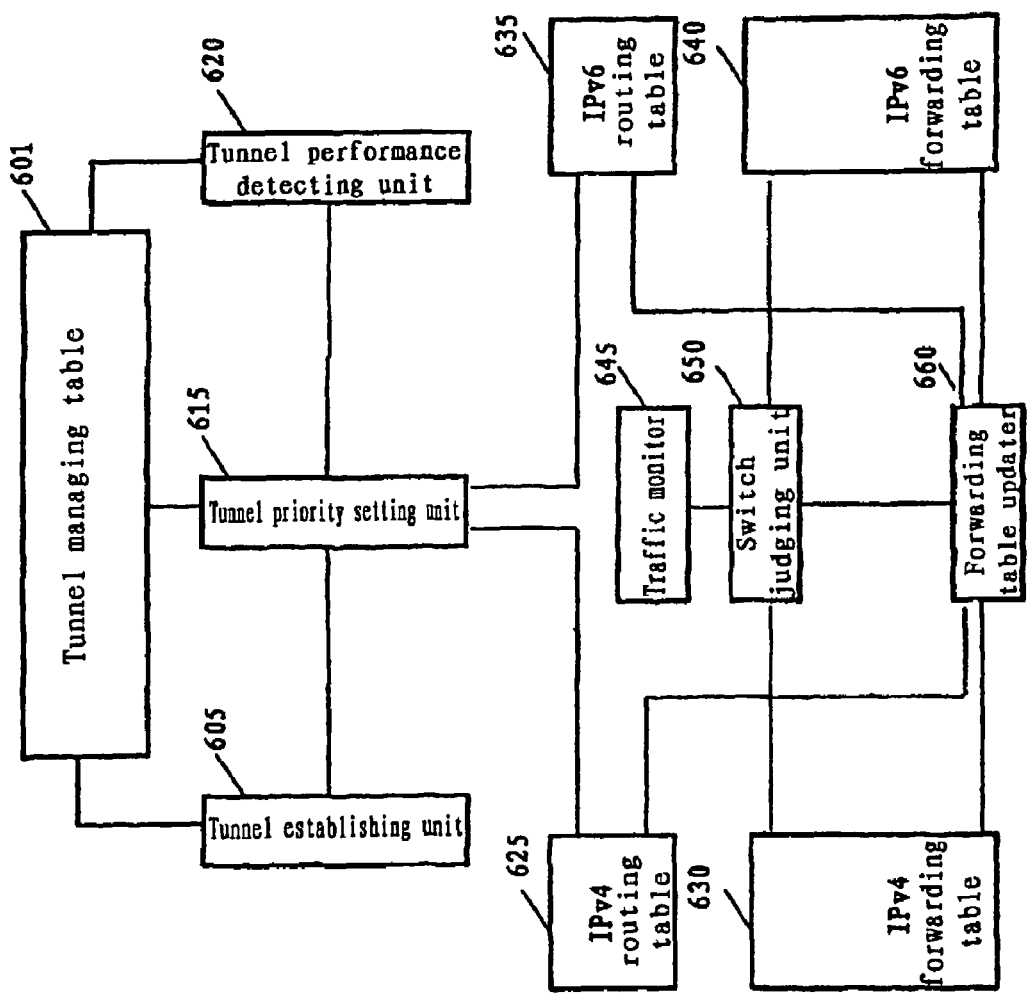
FIG. 6 is a block diagram showing the structure of the edge router according to the present invention.

FIG. 6 is a block diagram showing the structure of a traffic balancing apparatus according to the first embodiment of the present invention. As shown in FIG. 6, the traffic balancing apparatus of the present invention comprises: a tunnel managing table 601, a tunnel establishing unit 605, a tunnel priority setting unit 615, a tunnel performance detecting unit 620, a switch judging unit 650, a traffic monitor 645 and a forwarding table updater 660.

The IPv4 routing table 625, the IPv4 forwarding table 630, the IPv6 routing table 635 and the IPv6 forwarding table 640 are tables used by the edge router. The traffic balancing apparatus of the present invention performs traffic balancing between the IPv4 network and the IPv6 network by using the information in these tables.

For the convenience of illustration, the routing table and the forwarding table are described by taking the IPv4 routing table 625 and the IPv4 forwarding table 630 as examples. Here, for the IPv6 routing table 635 and the IPv6 forwarding table 640 or other routing tables and forwarding tables under other IP protocols, a similar process will be performed.

The tunnel establishing unit 605 creates entries of available tunnels for IPv4 destination subnets in the IPv4 routing table 625, based on the existing tunnel routing technology, and adds them to the tunnel managing table 601. The entries of available tunnels comprise the IPv4 addresses of the IPv4 destination subnets and the next hop IPv6 addresses of the available tunnels.

FIG. 7 shows the structure of the tunnel managing table 601 according to the present invention. Two IPv6 tunnel paths T1 and T2 established for a destination subnet 2 are illustratively shown in the tunnel managing table 601. The IPv4 address of the destination subnet 2 is stored in a destination subnet field 701, and the next hop IPv6 address of the IPv6 tunnel path T1 and the next hop IPv6 address of the IPv6 tunnel path T2 are stored in a tunnel next hop field 705.

The tunnel performance detecting unit 620 detects the performance of each of the available tunnels by using the route performance detecting function of the existing routing protocols. A simple way is, for example, to measure the delay/packet loss rate or the like of respective tunnel paths by transmitting some detecting packets to the respective tunnel paths in the tunnel managing table 601, and then store the performance evaluation results of the respective tunnel paths in a score field 710 based on the results of the measurement.

The tunnel priority setting unit 615 sets priorities for the respective tunnel paths arriving at the same one IPv4 destination subnet, based on the scores given by the tunnel performance detecting unit 620. The priorities may be treated as a composite evaluation on the plurality of measurement indices in the field 710, such as delay and packet loss rate. In this embodiment, for example, the priority of T1 is set to 1 and the priority of T2 is set to 2 in a priority field 715 of the tunnel managing table 601. The smaller the number is, the higher the priority is. Therefore, the priority of T1 is higher than that of T2.

In addition, for a destination subnet, the tunnel priority setting unit 615 selects a tunnel path having the highest priority from the tunnel paths in the tunnel managing table 601 corresponding to the destination subnet, and adds the tunnel path to the IPv4 routing table.

FIGS. 8A and 8B show the tunnel managing table 601 and the IPv4 routing table 625, respectively. A record whose routing entry is the entry of the tunnel path T1 is added for the destination subnet 2 in the IPv4 routing table 625. FIG. 8C shows the IPv4 forwarding table 630. FIG. 8D shows the IPv4 forwarding table 630 after being traffic balanced. The updating process of the IPv4 forwarding table will be described in detail later.

The traffic monitor 645 monitors a bandwidth occupation rate $O_{Li}$ (where i is a port number, and Li represents an output path via each of the output ports) of each of the output ports of the edge router, and informs the switch judging unit 650 of the results.

In determining whether or not the traffic is needed to be adjusted, the following idea is adopted by the inventor to determine whether or not to adjust the traffic of a certain output port.

It is assumed that the output paths (links) via output ports (not shown) of the edge router are $(L_1, L_2, \ldots L_i, \ldots L_N)$, where i is a port number, N is the number of the output ports, $1 \leq i \leq N$, and $L_i$ is an output path via the $i_{th}$ output port. Also, it is assumed that the bandwidth occupation ratios of the output paths via the output ports of the edge router are $(O_{L1}, O_{L2}, \ldots O_{Li}, \ldots O_{LN})$.

An imbalance threshold $TH_{imbalance}$ is preset. The situation of $O_{Li}/O_{Lj} \geq TH_{imbalance}$ represents that traffic imbalance occurs between an output path $L_i$ via the $i_{th}$ output port and an output path $L_j$ via the $j_{th}$ output port, where $1 \leq j \leq N$ and $i \neq j$.

A port overload threshold $TH_{overload}$ is preset. The situation of $O_{Li} \geq TH_{overload}$ represents that traffic overload occurs in the output path $L_i$ via the $i_{th}$ output port.

When $O_{Li}/O_{Lj} \geq TH_{imbalance}$ and $O_{Li} \geq TH_{overload}$, or when $O_{Lj}/O_{Li} \geq TH_{imbalance}$ and $O_{Lj} \geq TH_{overload}$, it represents that the traffic adjustment is needed between $L_i$ and $L_j$. When $O_{Li}/O_{Lj} \geq TH_{imbalance}$ and $O_{Li} \geq TH_{overload}$, it represents that the traffic adjustment is needed in the output path $L_i$ via the $i_{th}$ output port.

The next hop addresses corresponding to the respective output ports in the output paths can be obtained in advance for the output paths $(L_1, L_2, \ldots L_i, \ldots L_N)$ passing through the output ports of the edge router.

Figure 9:
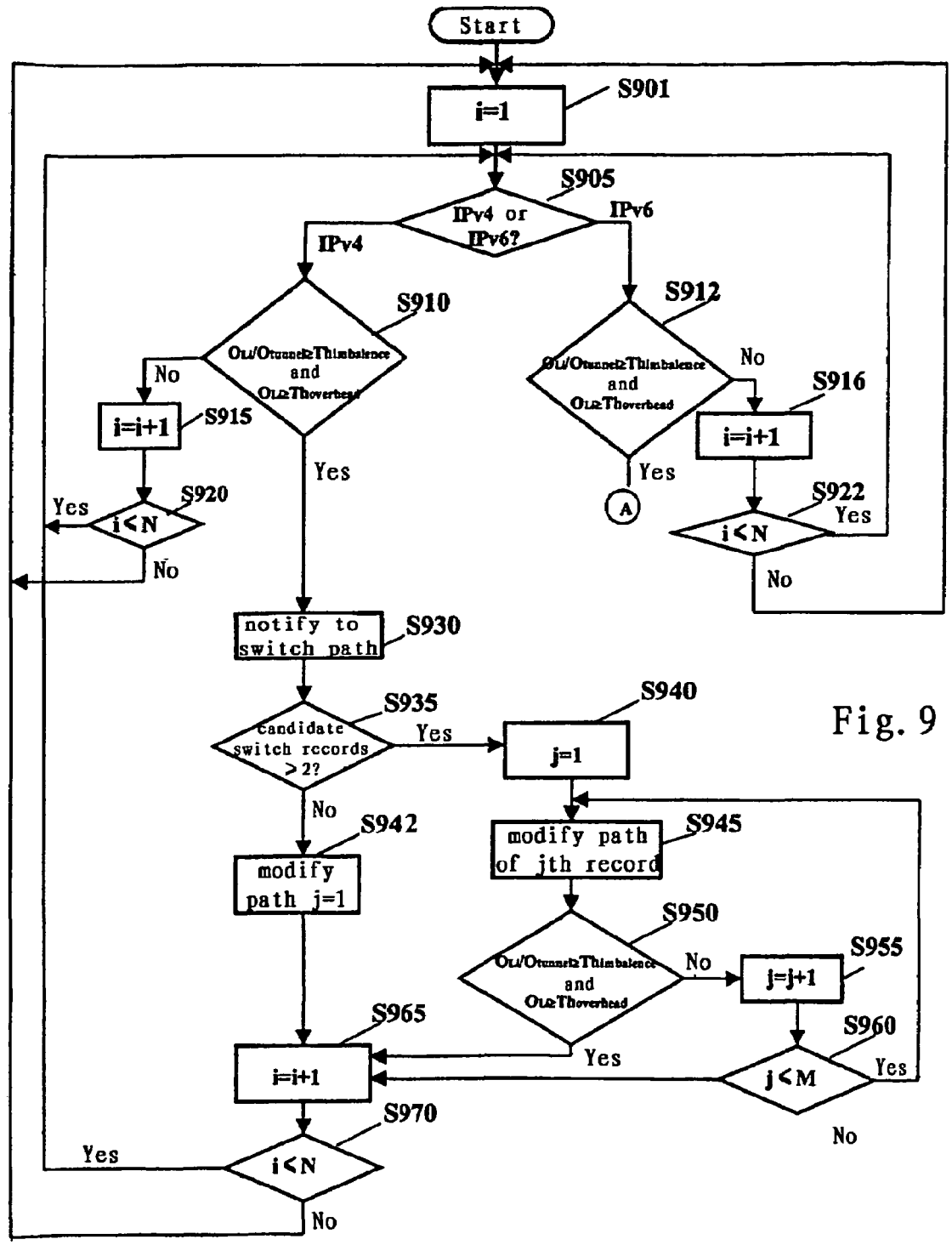
FIG. 9 is a flowchart showing a switching process according to the first embodiment of the present invention.
Figure 9:
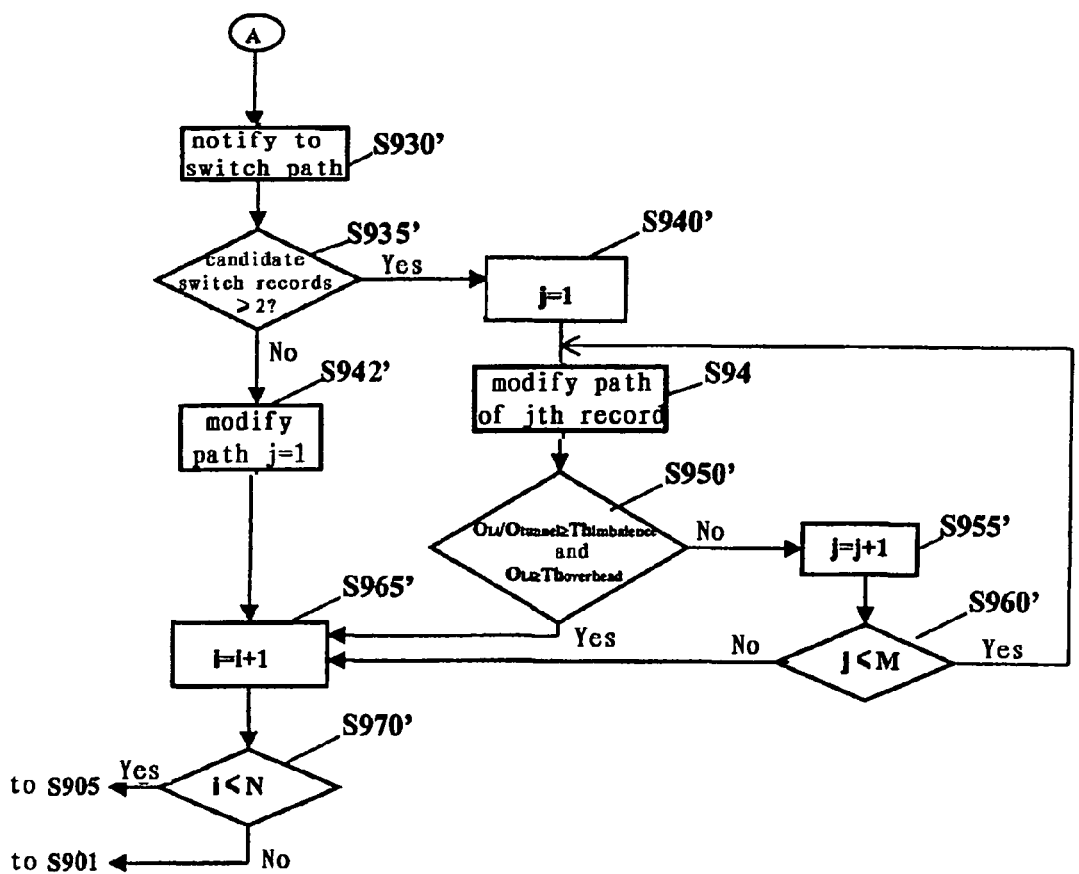

The switch judging unit 650 of the present invention uses the following way to determine whether or not to balance some traffic into the tunnel path for a certain output port: comparing the bandwidth occupation ratio of the $i_{th}$ output port directly with the bandwidth occupation ratio $O_{tunnel}$ of the tunnel path $L_{tunnel}$ corresponding to the output port. If $O_{Li}/O_{tunnel} \geq TH_{imbalance}$ and $O_{Li} \geq TH_{overload}$, then some traffic of the output path $L_i$ passing through the $i_{th}$ output port needs to be adjusted into the tunnel path. The output port corresponding to the tunnel path $L_{tunnel}$ is determined by looking up the entry of the tunnel path $L_{tunnel}$ corresponding to the output port from the routing table, thereby determining the bandwidth occupation ratio of the tunnel path $L_{tunnel}$. FIG. 9 is a flowchart diagram showing the switch process according to the first embodiment of the present invention.

First, in step S901, set i=1.

Then, in step S905, the switch judging unit 650 determines whether the next hop address of the output path passing through the $i_{th}$ output port is an IPv4 address or an IPv6 address. If it is an IPv4 address, the process proceeds to step S910. If it is an IPv6 address, the process proceeds to step S912.

In step S910, it is determined whether or not $O_{Li}/O_{tunnel} \geq TH_{imbalance}$ and $O_{Li} \geq TH_{overload}$ for the $i_{th}$ output port. If the result is NO, the process proceeds to step S915, where i is increased by 1. In step S920, it is determined whether or not $i \leq N$. If the result is NO, the process returns to step S901, where a new cycle of switch judgment begins again. If the result is YES, the process returns to step S905, where the switch judgment is made for the next output port.

If the result of step S910 is YES, the process proceeds to step S930, where the switch judging unit 650 notifies the forwarding table updater 660 to modify the record of the destination subnet having the next hop IPv4 address corresponding to the current $i_{th}$ output port in the IPv4 forwarding table 630. In step S935, in response to this notification, the forwarding table updater 660 looks up the IPv4 forwarding table 630 for the records having this next hop IPv4 address as candidate switch records, and determines whether or not the number M of the candidate switch records is equal to or larger than 2. Where there is only one record, the process proceeds to step S942, where the forwarding table updater 660 substitutes the next hop address in the record with the IPv6 address of the tunnel path entry corresponding to the destination subnet in the record in the IPv4 routing table 625. In step S965, i is increased by 1. In step S970, it is determined whether or not i is equal to or smaller than N. If the result is NO, the process returns to step S901, where a new cycle of switch judgment begins again. If the result is YES, the process returns to step S910, where the switch judgment is made for the next output port.

If, in step S935, it is determined that the number M of the records is equal to or larger than 2, the process proceeds to step S940, setting j=1. In step S945, the next hop address of the $j_{th}$ record in the M candidate switch records is switched according to the operation in step S940. The process then proceeds to step S950, where a similar process to step S910 is performed, to judge in real time whether or not the $i_{th}$ output port needs traffic adjustment after switch. If it is determined that the traffic adjustment is not needed, the process proceeds to step S965. Otherwise, the process proceeds to step S995, where j is increased by 1. In step S960, it is determined whether or not j is equal to or smaller than M. If the result is YES, the process proceeds to step S965. If the result is NO, the process returns to step S945 and continues.

In step S912, it is determined whether or not $O_{Li}/O_{Lj} \geq TH_{imbalance}$ and $O_{Lj} \geq TH_{overload}$ for the $i_{th}$ output port. If the result is NO, the process proceeds to step S916, where i is increased by 1. In step S922, it is determined whether or not i≦N. If the result is NO, the process returns to step S901, where a new cycle of switch judgment begins again. If the result is YES, the process returns to step S905 where the switch judgment is made for the next output port.

If, in step S912, it is determined that the conditions are satisfied, i.e., the result of step S912 is YES, the process proceeds to step S930', where the switch judging unit 650 notifies the forwarding table updater 660 to modify the record of the destination subnet having the next hop IPv6 address corresponding to the current $i_{th}$ output port in the IPv6 forwarding table 640.

In step S935', in response to this notification, the forwarding table updater 660 looks up the IPv6 forwarding table 640 for the records having the next hop IPv6 address as candidate switch records, and judges whether or not the number M of the candidate switch records is equal to or larger than 2. When there is only one record, the process proceeds to step S942', where the forwarding table updater 660 substitutes the next hop address in the record with the IPv4 address of the tunnel path entry corresponding to the destination subnet in the record in the IPv6 routing table 635. In step S965', i is increased by 1. In step S970', it is determined whether or not i is equal to or smaller than N. If the result is NO, the process returns to step S901, where a new cycle of switch judgment begins again. If the result is YES, the process returns to step S910, where the switch judgment is made for the next output port.

If, in step S935', it is determined that the number M of the records is equal to or larger than 2, the process proceeds to step S940', where j is increased by 1. In step S945', the next hop address of the $j_{th}$ record in the M candidate switch records is switched according to the operation in step S940'. The process then proceeds to step S950', where a similar process to step S910 is performed, to judge in real time whether or not the $i_{th}$ output port needs traffic adjustment after switch. If it is determined that the traffic adjustment is not needed, the process proceeds to step S965'. Otherwise, the process proceeds to step S995', where j is increased by 1. In step S960', it is determined whether or not j is equal to or smaller than M. If the result is YES, the process proceeds to step S965'. If the result is NO, the process returns to step S945' and continues.

For a certain next hop IPv4 or IPv6 address, there may be a plurality of forwarding entries of the destination subnet corresponding to it. Therefore, in the switch process according to the first embodiment of the present invention, the forwarding table updater 660 randomly selects a forwarding entry for switching from the plurality of forwarding entries that need to be adjusted one by one. At the same time, the switch judging unit 650 detects the traffic in real time. If it is found that at a certain moment in the process of path switching, the traffic comes back to the balance, then the forwarding table updater 660 stops modifying the forwarding entries. According to the first embodiment of the present invention, if the direct path D1 is determined to be overloaded at this time, then part of its traffic is needed to be balanced into the IPv6 tunnel path T1. Therefore, the forwarding table updater 660 substitutes the next hop IPv4 address of the destination subnet 2 in FIG. 8C with the next hop information of the IPv6 tunnel path T1, thereby obtaining the IPv4 forwarding table shown in FIG. 8D. In FIG. 8, the next hop information uses the IPv6 tunnel ID of T1, this is because an IPv6 tunnel table (not shown) may be used for storing the next hop information of such tunnel paths in the edge router, and IPv6 tunnel IDs may be used for indexing. Based on the real-time traffic conditions, the forwarding table updater 660 can also substitutes the next hop information of the IPv6 tunnel path T1 in FIG. 8D with the next hop IPv4 address of the destination subnet 2 given in the IPv4 routing table shown in FIG. 8B.

Figure 10:
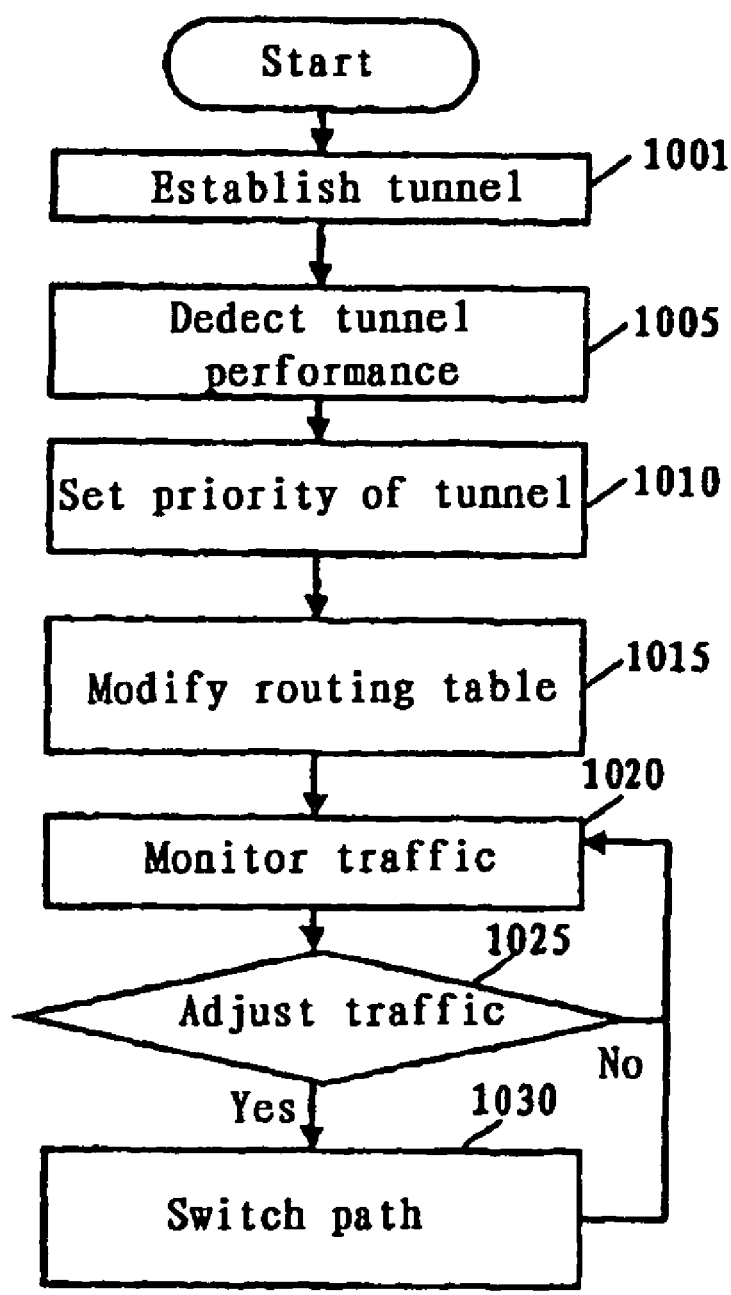
FIG. 10 is a flowchart showing a control process according to the first embodiment of the present invention.

FIG. 10 is a flowchart showing the control process according to the first embodiment. First, in step S1001, the tunnel establishing unit 605 establishes one or more tunnel paths for the destination subnet. In step S1005, the tunnel performance detecting unit 620 scores the established one or more tunnel paths. In step S1010, the tunnel priority setting unit 615 sets the priorities of the established one or more tunnel paths based on the scores, and then in step S1015, the entry of the tunnel path having the highest priority is added to the routing table. In step S1020, the traffic monitor 645 monitors the IPv4 traffic and the IPv6 traffic. In step S1025, the switch judging unit 650 judges whether or not the IPv4 traffic and the IPv6 traffic are needed to be adjusted. When the IPv4 traffic and the IPv6 traffic need to be adjusted, the process proceeds to step S1030, where the forwarding table updater 660 switches the next hop address in the forwarding table. Otherwise, the process returns to step S1020 and continues to monitor the traffic.

In the first embodiment, not only the entry record of the direct path, but also the entry record of the tunnel path are stored for the destination subnet in the IPv4 routing table; while only the next hop IPv4 or IPv6 address having the highest priority at present is stored for each destination subnet in the IPv4 forwarding table. If traffic imbalance occurs in the IPv4 network and the IPv6 network, the next hop IPv4 addresses or the IPv6 tunnel paths of some destination subnets in the IPv4 forwarding table are modified to the next hop addresses of the IPv6 tunnel paths or the IPv4 direct paths in the routing table, thereby the next hop address taking traffic balance into consideration is always held in the IPv4 forwarding table. Therefore, when forwarding the IP packets, the IP packets can be forwarded to the network having less traffic so that the balance between the IPv4 traffic and the IPv6 traffic can be maintained.

Figure 11:
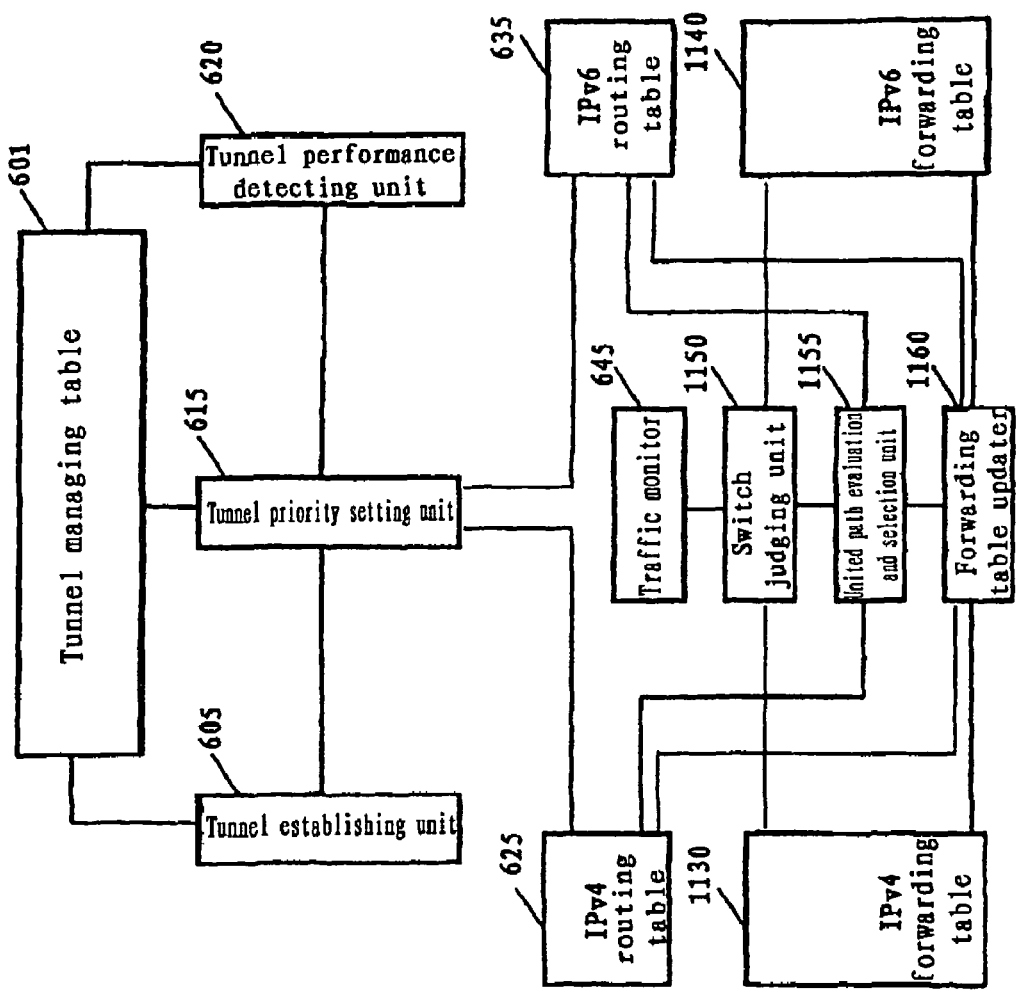
FIG. 11 is a block diagram showing the structure of a traffic balancing apparatus according to the second embodiment of the present invention.

The second embodiment of the present invention will be described below. FIG. 11 is a block diagram showing the structure of the traffic balancing apparatus according to the second embodiment of the present invention. The following functions supported by some existing routers are considered: information of a plurality of next hops is allowed to be stored in the record of a certain destination subnet in the forwarding table, and load balance can be achieved in the plurality of next hops by using the existing load balancing algorithms in the routers. The second embodiment is achieved on the basis of these functions. However, in the existing routers, load balance is performed directed to the same next hop of the plurality of IP protocols. Accordingly, the second embodiment can perform load balance directed to the different next hops of the plurality of IP protocols.

The same reference numerals are used for the same elements as those of the first embodiment, thus the description thereof is omitted. The second embodiment differs from the first embodiment mainly in that the contents of an IPv4 forwarding table 1130 and an IPv6 forwarding table 1140 are different from those of the first embodiment. Accordingly, the corresponding process in the second embodiment is different.

Now the description will be given by taking the IPv4 routing table 625 and the IPv4 forwarding table 1130 as examples. FIGS. 12A and 12B show the tunnel manage tale 601 and the IPv4 routing table 625, respectively. A record whose routing entry is the entry of the tunnel path T1 is added to the IPv4 routing table 625 for the destination subnet 2. FIGS. 12A and 12B are the same as FIGS. 8A and 8B.

FIG. 12C shows the IPv4 forwarding table 1130 according to the second embodiment of the present invention. FIG. 12D shows the IPv4 forwarding table 1130 after processed.

The IPv4 forwarding table 1130 differs from the IPv4 forwarding table 630 in the first embodiment in that, the IPv4 forwarding table 1130 stores information of a plurality of next hops for a destination subnet, and includes a multi-hop address enable bit. If the enable bit is 1, it represents that the plurality of next hop addresses are enabled, and a next hop selecting unit to be described later uses the traffic balancing algorithm carried by the router itself to select a next hop capable of balancing the traffic among the plurality of next hop addresses. If the enable bit is 0, only one of the plurality of next hops is enabled (for example, the next hop 1). The information of the plurality of next hops in the IPv4 forwarding table 1130 may be the next hop information of the IPv4 direct path, or the next hop information of the IPv6 tunnel path. There are three pieces of next hop information stored in the second embodiment, two of which are IPv4 next hop addresses, and the remainder is the next hop information of the IPv6 tunnel path (for example, the IPv6 tunnel path ID). According to the second embodiment of the present invention, for a destination subnet, a united path evaluation and selection unit 1155 determines two preferred IPv4 entries from the IPv4 entry records in the IPv4 routing table 625 shown in FIG. 12B, according to existing route evaluation and selection methods, and adds them to the corresponding destination subnet record in the IPv4 forwarding table 1130, together with the best IPv6 tunnel entry that has been added into the IPv4 routing table 625. When the traffic is balanced, the multi-hop address enable bit is 0. When the switch judging unit 1150 judges that the traffic adjustment is needed, the forwarding table updater 1160 sets some multi-hop address enable bits in the IPv4 forwarding table 1130 to 1, thus a next hop selecting unit to be described later can balance the traffic between the IPv4 and IPv6 paths by using the balancing algorithm.

Figure 13:
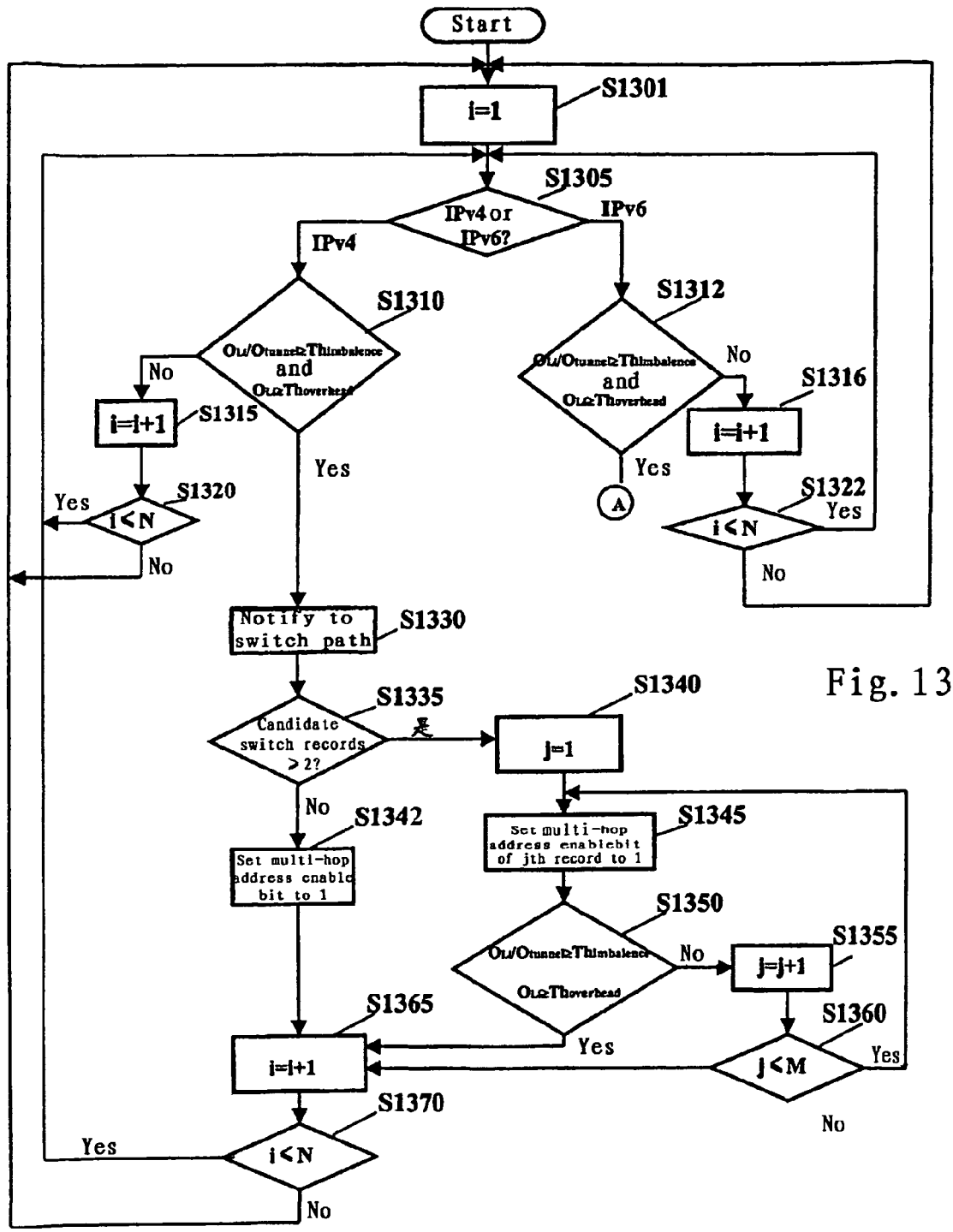
FIG. 13 is a flowchart showing a switching process according to the second embodiment of the present invention.
Figure 13:
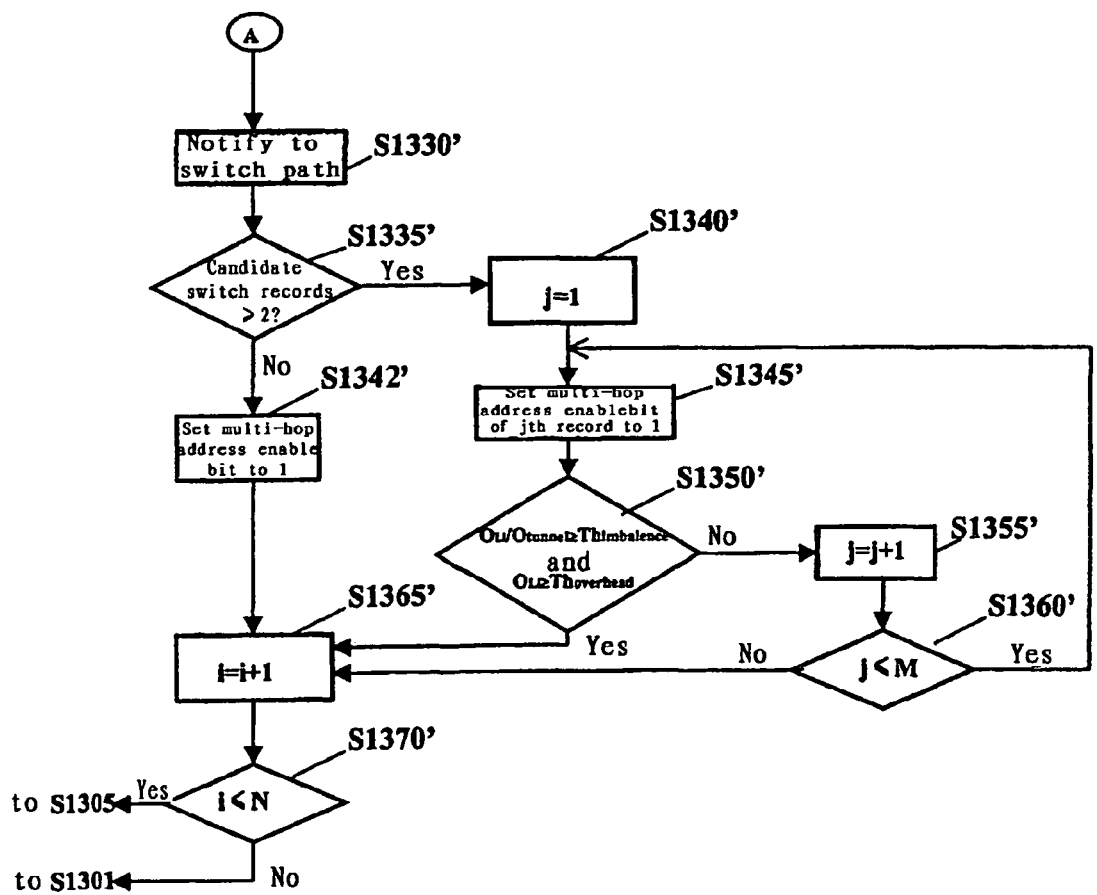

FIG. 13 is a flowchart showing the switch process according to the second embodiment of the present invention.

First, in step S1301, set i=1.

Then, in step S1305, the switch judging unit 650 judges whether the next hop address of the output path via the $i_{th}$ output port is an IPv4 address or an IPv6 address. If it is an IPv4 address, the process proceeds to step S1310. If it is an IPv6 address, the process proceeds to step S1312.

In step S1310, it is determined whether or not $O_{Li}/O_{Lj} \geq TH_{imbalance}$ and $O_{Li} \geq TH_{overload}$ for the $i_{th}$ output port. If the result is NO, the process proceeds to step S1315, where i is increased by 1. In step S1320, it is determined whether or not i≦N. If the result is NO, the process returns to step S1301, where a new cycle of switch judgment begins again. If the result is YES, the process returns to step S1305, where the switch judgment is made for the next output port.

In step S1330, the switch judging unit 650 notifies the forwarding table updater 660 to modify the destination subnet record having the next hop IPv4 address corresponding to the current $i_{th}$ output port in the IPv4 forwarding table 630. In step S1335, in response to this notification, the forwarding table updater 660 looks up the IPv4 forwarding table 630 for the records having the next hop IPv4 address as candidate switch records, and judges whether or not the number M of the candidate switch records is equal to or larger than 2. When there is only one record, the process proceeds to the step S1342, where the forwarding table updater 660 modifies the multi-hop address enable bit in the record to 1. In step S1365, i is increased by 1. In step S1370, it is determined whether or not i is equal to or smaller than N. If the result is NO, the process returns to step S1301, where a new cycle of switch judgment begins again. If the result is YES, the process returns to step S1310, where the switch judgment is made for the next output port.

If, in step S1335, it is determined that the number M of the records is equal to or larger than 2, the process proceeds to step S1340, where let j=1. In step S1345, for the $j_{th}$ record of the M candidate switch records, the multi-hop address enable bit in the record is modified to 1 according to the operation of step S1340. The process then proceeds to step S1350, where a similar process to step S1310 is performed, to judge in real-time whether or not the $i_{th}$ output port needs the traffic adjustment after the switch operation. If it is judged that there does not need traffic adjustment, the process proceeds to step S1365. Otherwise, the process proceeds to step S1355, where j is increased by 1. In step S1360, it is determined whether or not j is equal to or smaller than M. If the result is YES, the process proceeds to step S1365. If the result is NO, the process returns to step S1345 and continues.

In step S1312, for the $i_{th}$ output port, it is judged whether or not $O_{Li}/O_{tunnel} \geq TH_{imbalance}$ and $O_{Li} \geq TH_{overload}$. If the result is NO, the process proceeds to step S1316, where i is increased by 1. In step S1322, it is determined whether or not i≦N. If the result is NO, the process returns to step S1301, where a new cycle of switch judgment begins again. If the result is YES, the process returns to step S1305, where the switch judgment is made for the next output port.

If, in step S1312, it is determined that the conditions are satisfied, i.e., the result is YES, the process proceeds to step S1330', where the switch judging unit 650 notifies the forwarding table updater 660 to modify the destination subnet record having the next hop IPv6 address corresponding to the current $i_{th}$ output port in the IPv6 forwarding table 640.

In step S1335', in response to this notification, the forwarding table updater 660 looks up the IPv6 forwarding table 640 for the records having the next hop IPv6 address as candidate switch records, and judges whether or not the number M of the candidate switch records is equal to or larger than 2. When there is only one record, the process proceeds to the step S1342', where the forwarding table updater 660 modifies the multi-hop address enable bit in the record to 1. In step S1365', i is increased by 1. In step S1370', it is determined whether or not i is equal to or smaller than N. If the result is NO, the process returns to step S1301, where a new cycle of switch judgment begins again. If the result is YES, the process returns to step S1310, where the switch judgment is made for the next output port.

If, in step S1335', it is determined that the number M of the records is equal to or larger than 2, the process proceeds to step S1340', setting j=1. In step S1345', for the $j_{th}$ record in the M candidate switch records, the multi-hop address enable bit in the record is modified to 1 according to the operation of step S1340'. The process then proceeds to step S1350', where a similar process to step S1310 is performed to judge in real-time whether or not the $i_{th}$ output port reaches traffic balance after the switch operation. If it is determined that the $i_{th}$ output port has reached traffic balance, the process proceeds to step S1365'. Otherwise, the process proceeds to step S1355', where j is increased by 1. In step S1360', it is determined whether or not j is equal to or smaller than M. If the result is YES, the process proceeds to step S1365'. If the result is NO, the process returns to step S1345' and continues.

Figure 14:
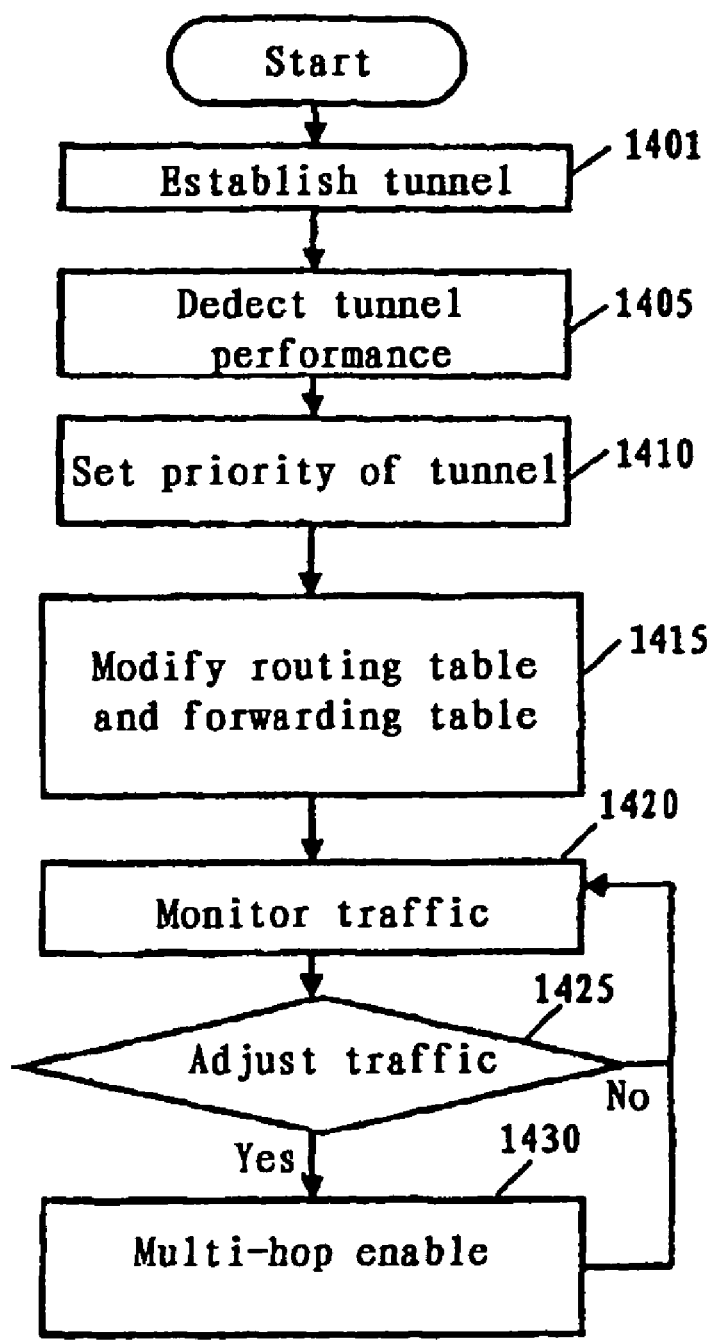
FIG. 14 is a flowchart showing a control process according to the second embodiment of the present invention.

FIG. 14 is a flowchart showing the overall control process according to the second embodiment First, in step S1401, the tunnel establishing unit 605 establishes one or more tunnel paths for the destination subnet. In step S1405, the tunnel performance detecting unit 620 scores the established one or more tunnel paths. In step S1410, the tunnel priority setting unit 615 sets priorities of the established one or more tunnel paths based on the score. In step S1415, the tunnel priority setting unit 615 adds the entry of the tunnel path having the highest priority to the routing table. The united path evaluation and selection unit 1155 determines the preferred direct path entry for the destination subnet from the routing table, and adds it to the forwarding table. In step S1420, the traffic monitor 645 monitors the IPv4 traffic and the IPv6 traffic. In step S1425, the switch judging unit 1150 judges whether or not to adjust the IPv4 traffic and the IPv6 traffic. When the IPv4 traffic and the IPv6 traffic need to be adjusted, the process proceeds to step S1430, where the forwarding table updater 1160 modifies the multi-hop address enable bits in the forwarding table from 0 to 1. Otherwise, the process returns to step S1420 and continues to monitor the traffic.

According to the above second embodiment, the next hop IPv4 addresses and the next hop IPv6 address are stored in advance for the destination subnet, which could be used to determine the next hop address of the IP packet to be forwarded at the moment of traffic imbalance between the IPv4 traffic and the IPv6 traffic, thereby dynamically adjusting the IPv4 traffic and the IPv6 traffic.

In addition, in the second embodiment of the present invention, a similar IPv6 or IPv4 tunnel table as that of the first embodiment can be used. For a given tunnel ID, the next hop IP address corresponding to the tunnel, instead of the destination subnet address corresponding to the tunnel, is directly stored in the tunnel table. This can avoid the problem of a dead cycle caused by looking up the forwarding table again due to an attempt to obtain the next hop address.

Figure 15:
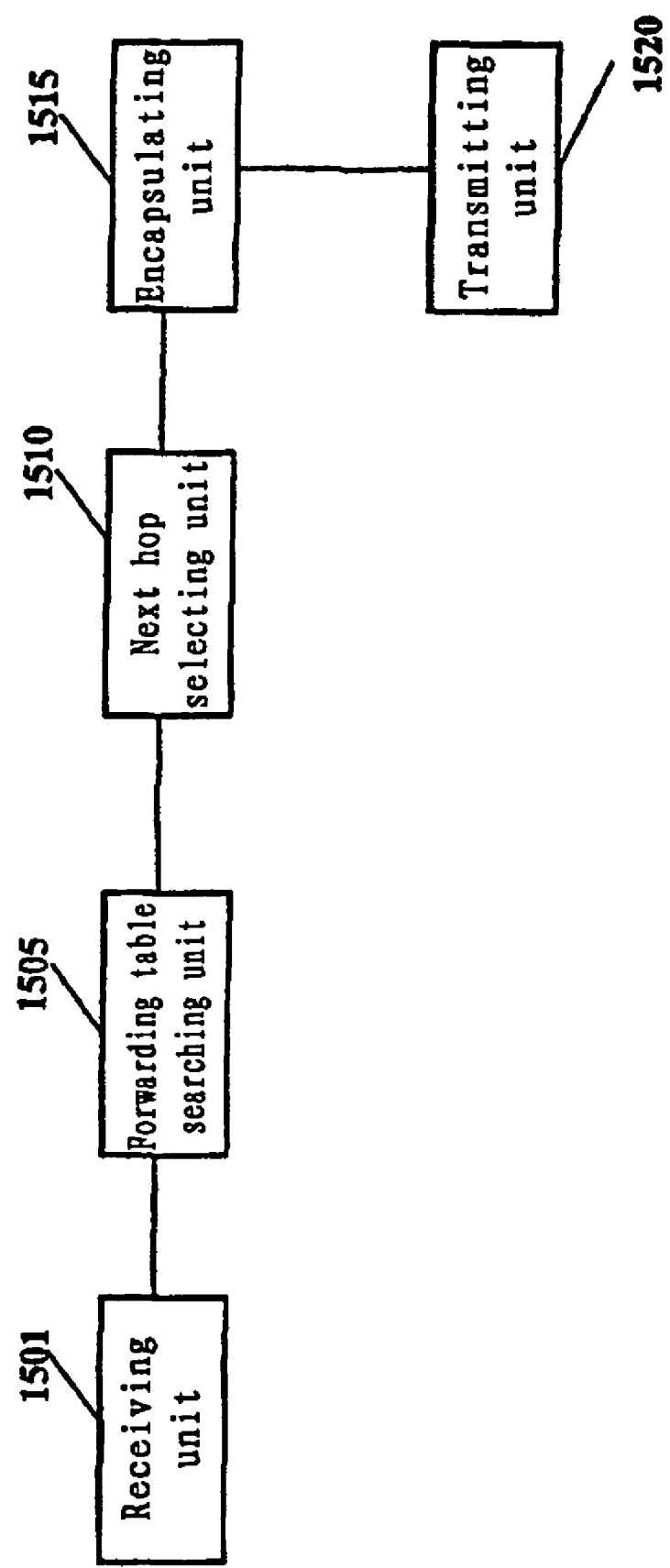
FIG. 15 is a diagram showing the structure of a forwarding device in the data layer according to the second embodiment of the present invention.

FIG. 15 is a diagram showing the structure of a forwarding device in the data layer according to the second embodiment of the present invention. The forwarding device comprises a receiving unit 1501, a forwarding table searching unit 1505, a next hop selecting unit 1510, an encapsulating unit 1515 and a transmitting unit 1520.

Figure 16A:
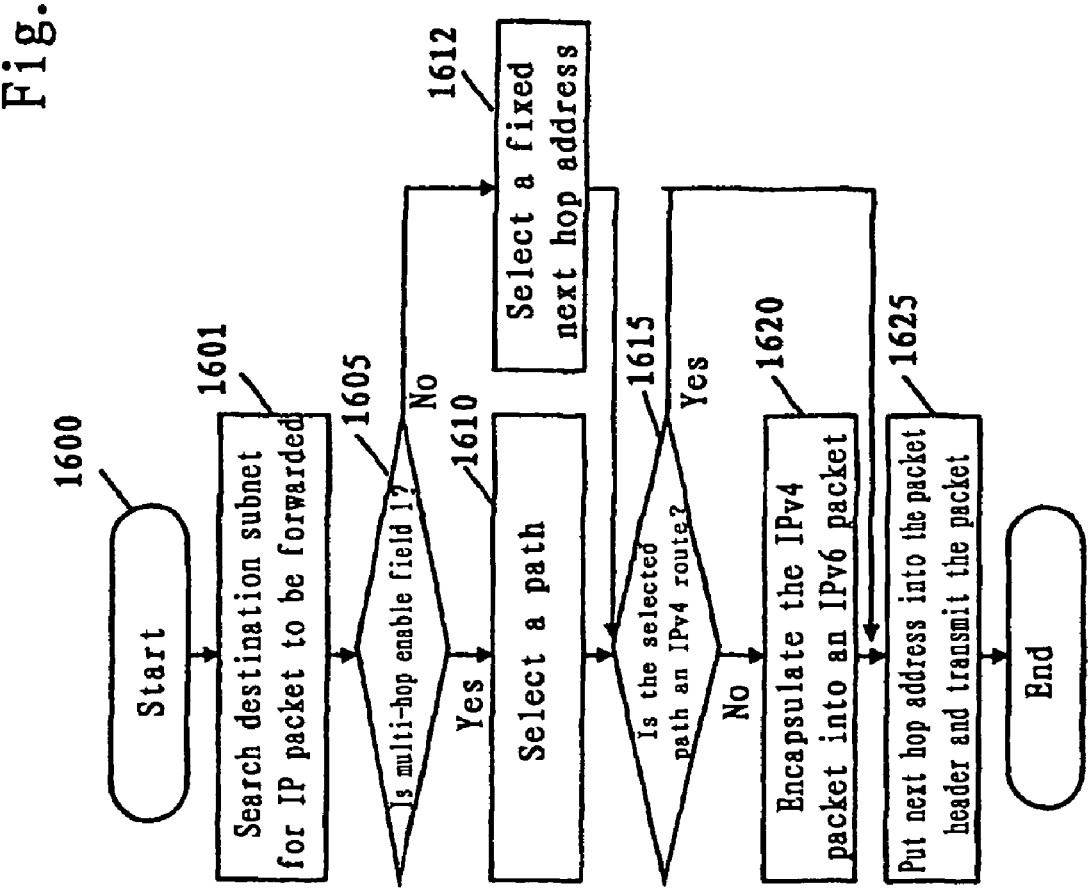
FIGS. 16A and 16B are flowcharts showing a process performed by the forwarding device according to the second embodiment of the present invention.
Figure 16B:
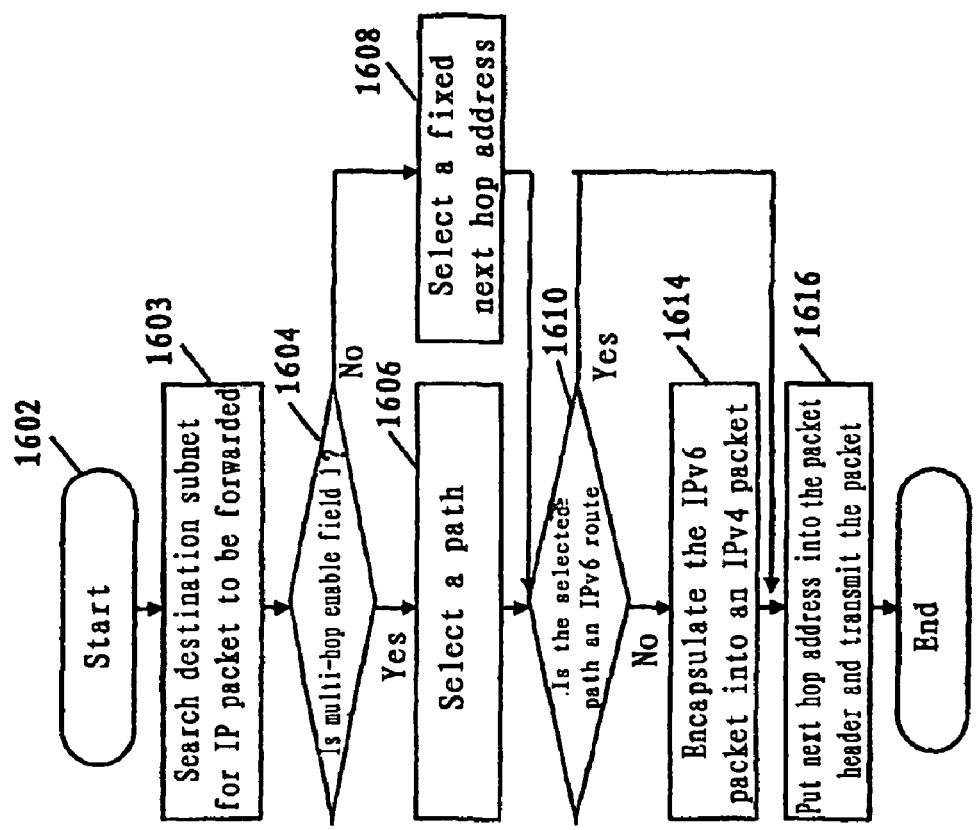

The process performed by the forwarding device will be described below with reference to FIG. 16. FIG. 16A shows a process for the IPv4 packet, and FIG. 16B show a process for the IPv6 packet.

As shown in FIG. 16A, in step S1600, the receiving unit 1501 receives an IPv4 packet to be forwarded. In step S1601, the forwarding table searching unit 1505 searches the destination subnet record for the IPv4 packet to be forwarded. In step S1605, the forwarding table searching unit 1505 judges whether or not the value in the multi-hop address enable bit in the searched record is 1. If it is 1, in step S1610, the next hop selecting unit 1510 selects a next hop address from the next hop addresses of the searched record, based on the existing traffic balancing algorithms, for example, the traffic balancing algorithm carried by the router itself. Such traffic balancing algorithms, for example, randomly select a next hop from a plurality of candidate paths, or select the next hop of the path having less traffic from the plurality of candidate paths. If it is 0, in step S1612, the next hop selecting unit 1510 selects a fixed next hop address (for example, the first next hop address) from the next hop addresses of the searched record. In step S1615, the encapsulating unit 1515 determines whether or not the selected next hop address is an IPv4 address. If it is not an IPv4 address, then in step S1620, the encapsulating unit 1515 performs IPv6 encapsulation for the IPv4 packet. If it is an IPv4 address, the process proceeds to step S1625. In step S1625, the layer 2 MAC address of the searched next hop is put into the layer 2 header of the packet, and the IPv4 packet is forwarded by the transmitting unit 1520. The process of FIG. 16B is similar to that of FIG. 16A, and thus the description thereof is omitted.

According to the second embodiment of the present invention, the plurality of next hop addresses including the IPv4 addresses and the IPv6 addresses are stored in the IPv4 forwarding table, such that a forwarding path taking traffic balance into consideration can be selected from the plurality of next hop addresses when traffic imbalance occurs. The second embodiment has stronger real-time adjustment capability compared with the first embodiment.

The third embodiment of the present invention will be described below. The third embodiment differs from the second embodiment in that updating timing and updating content of the forwarding table are different.

In the third embodiment, the united path evaluation and selection unit 1155 determines two preferred IPv4 entries from the IPv4 entry records in the IPv4 routing table 625 shown in FIG. 12B according to the existing route evaluation and selection methods, adds them to the IPv4 forwarding table, and the multi-hop address enable bit in the IPv4 forwarding table 1130 is always set to 1, thereby the next hop selecting unit 1510 in the data layer can perform traffic balance between the two IPv4 direct paths. When the switch judging unit 1150 determines that traffic adjustment is needed, the forwarding table updater 1160 adds the IPv6 tunnel path information in the IPv4 routing table 625 to the IPv4 forwarding table, thereby the next hop selecting unit 1510 in the data layer can perform traffic balance between the two IPv4 direct paths and an IPv6 tunnel path.

Therefore, the switch control process according to the third embodiment is similar to the process of the first embodiment shown in FIG. 9. But according to the third embodiment, in stead of step S940, a next hop address of a tunnel path is added to a destination subnet record in the IPv4 forwarding table 1130 by using the IPv6 address of the tunnel path entry corresponding to the destination subnet in the IPv4 routing table 625, and instead of step S940', a next hop address of a tunnel path is added to a destination subnet record in the IPv6 forwarding table 1140 by using the IPv4 address of the tunnel path entry corresponding to the destination subnet in the IPv6 routing table 635.

The overall control process according to the third embodiment of the present invention is basically identical to the overall control process of the second embodiment as shown in FIG. 14. One of the differences between them is in that, according to the third embodiment, in step S1415, the tunnel priority setting unit 615 adds the entry of the tunnel path having the highest priority to the routing table, and the united path evaluation and selection unit 1155 determines the preferred direct path entry for the destination subnet from the routing table, and adds it to the forwarding table, rather than further adding the preferred tunnel path to the forwarding table according to the second embodiment. In addition, according to the third embodiment, the forwarding table updater 1160 adds the next hop information of the preferred tunnel path to the forwarding table, instead of step S1430 in the second embodiment.

Figure 17A:
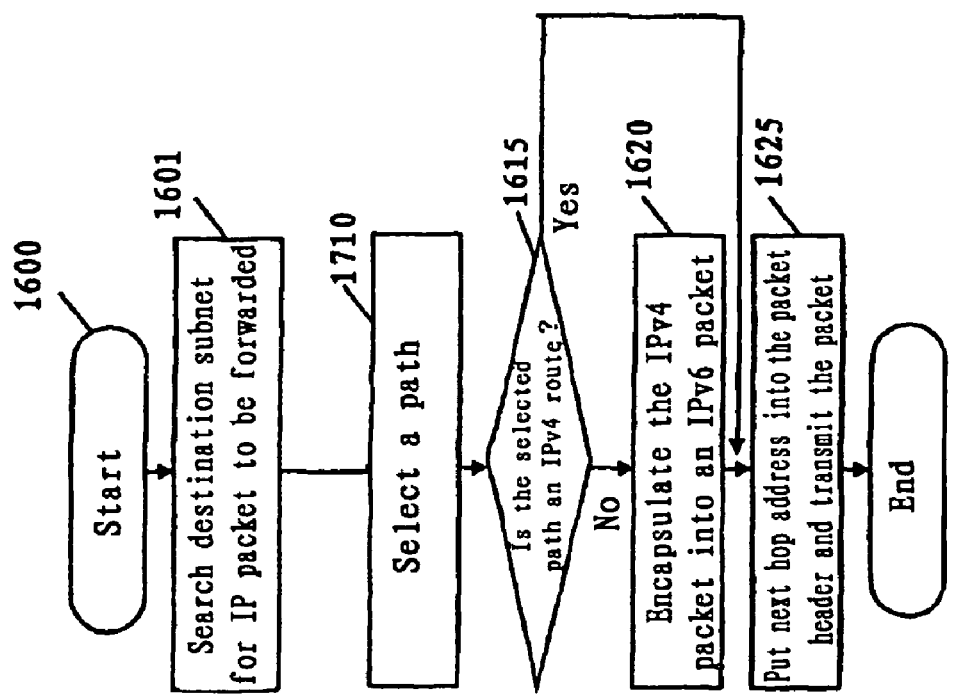
FIGS. 17A and 17B are flowcharts showing a process performed by the forwarding device according to the third embodiment of the present invention.
Figure 17B:
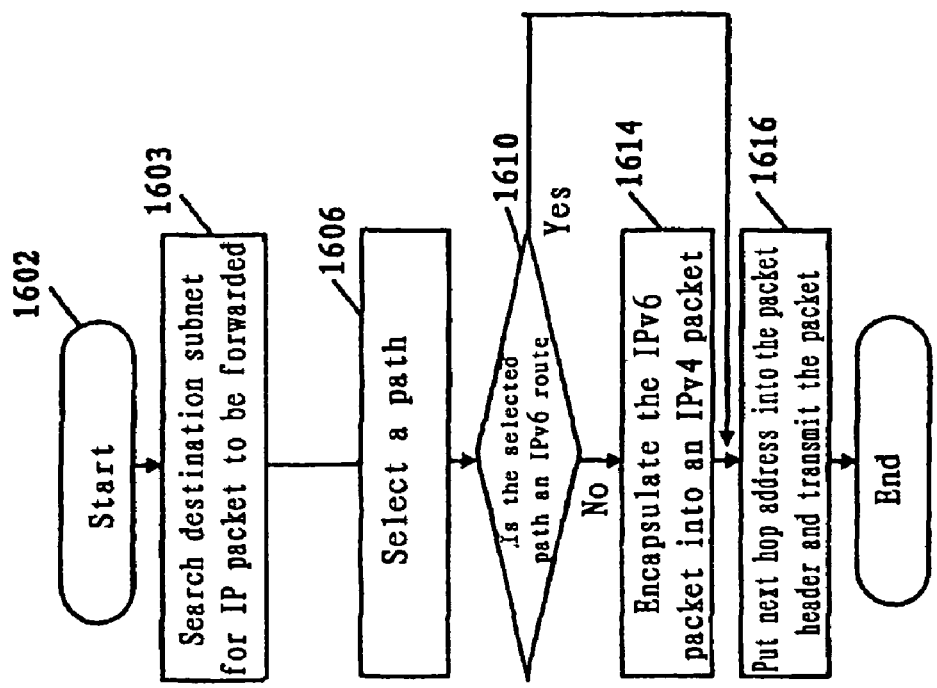

The process in the data layer according to the third embodiment of the present invention is shown in FIGS. 17A and 17B. The same reference numerals are used for the same elements as those of the second embodiment, and the differences between them are steps S1710 and S1706. In these two steps in the third embodiment, the next hop selecting unit 1510 selects a next hop address from the next hop addresses of the searched records according to the existing traffic balancing algorithms.

According to the third embodiment of the present invention, the edge router can perform traffic balancing to not only a plurality of candidate paths using the same IP protocol but also a plurality of candidate paths using different IP protocols, and so the traffic balancing capability becomes stronger.

The process of monitoring and adjusting the network traffic has been described by taking the edge router as an example. However, the present invention is not limited to the edge router, and can be applied to any packet forwarding apparatus located between different IP networks, for example, gateway, etc.

According to the present invention, the traffic balance between the IPv4 traffic and the IPv6 traffic is adjusted by dynamically determining whether the IP packet to be forwarded uses the direct path or the tunnel path in the edge router.

It is to be noted that, the embodiments described above merely intend to illustrate the present invention, and do not limit the present invention.

The objects of the present invention can be achieved by providing to the system or apparatus directly or indirectly storage media storing program codes of software for implementing the functions of the embodiments, reading out the program codes and performing the same by a computer of the system or apparatus. At this time, so long as the system or apparatus has the function of the program, the implementing way is not limited to the program.

Therefore, the program codes installed in the computer can implement the present invention since the functions of the present invention can be achieved by a computer. In other words, the claims of the present invention also comprise the computer program for realizing the functions of the present invention.

At this time, so long as the system or apparatus has the functions of the program, the program can be executed in the form of, for example, object codes, program executed by an interpreter, or script data provided to an operation system.

The storage media for providing the program codes comprise, for example, floppy disks, hard disks, optical disks, magneto-optic disks, CD-ROMs, CD-Rs, CD-RWs, magnetic tapes, non-volatile storage cards, ROMs and DVDs (DVD-ROMs and DVD-Rs), etc.

For the method for providing the program, a client computer may be connected to a website in the Internet via a browser in the client computer. The computer program or the compressed files automatically setup by the program of the present invention may be downloaded to the recording media such as hard disks. Further, the program according to the present invention may be provided by segmenting the program codes constituting the program into a plurality of files and downloading the files from different websites. In addition, the claims of the present invention also comprise such an approach that a WWW server downloads a program file for achieving the functions of the present invention to a plurality of users.

Moreover, the program according to the present invention may be encrypted and stored into the storage media such as CD-ROMs to be distributed to users, this allowing those users satisfying certain requirements to download encrypted encryption information via the Internet, and allowing the users to decrypt the encrypted program by using the encryption information, such that the program can be installed into the computers of the users.

Except that the functions of the embodiments of the present invention can be achieved by means of the computer executable program, the operation system running on the computer may perform all or part of the actual process to implement the embodiments described above through the process.

Further, after the program codes read out from the recording media are written into a function extendable board inserted into the computer and a memory provided in a function extendable unit connected to the computer, according to the instruction of the program, CPUs provided in the function extendable board and the function extendable unit perform all or part of the actual process. The situation where the functions of the above embodiments may be realized by means of the process is also included herein.

Although the embodiments of the present invention have been described in detail with reference to the appended drawings, for those skilled in the art, various changes and modifications can be made to the above embodiments without departing from the spirit and scope of the present invention. Therefore, the scope of the present invention is only defined by the attached claims.

The invention claimed is:

1. An IP packet forwarding method performed in a network forwarding apparatus for forwarding IP packets in different networks employing two or more IP protocols comprising IPv4 protocol and IPv6 protocol, the network forwarding apparatus comprising an edge router and supporting the two or more IP protocols and holding a routing table for storing routing information employing one of the IP protocols as a direct path toward a destination address, said IP packet forwarding method comprises the steps of:

determining, for the destination address employing the one of the IP protocols in the routing table of said network forwarding apparatus, one or more routing information employing other IP protocols, as tunnel paths toward the destination address wherein the routing information comprises the next hop IP address;

monitoring traffic in said different networks to judge whether the traffic among said different networks is balanced or not, wherein the judgment as to whether the traffic is balanced or not is made by monitoring bandwidth;

determining, for the IP packet to be forwarded containing the destination address, a forward path from said direct path and said tunnel paths, to balance the traffic among said different networks, when it is judged that traffic imbalance occurs among the different networks, wherein the step of determining the tunnel paths comprises the steps of:

determining, for the destination address employing the one of the IP protocols in said routing table of the network forwarding apparatus, one or more routing information employing other IP protocols, as candidate tunnel paths towards the destination address;

detecting the link transmission qualities of said determined candidate tunnel paths;

determining priorities of the candidate tunnel paths based on the detected link transmission qualities of the candidate tunnel paths; and determining the tunnel paths from the candidate tunnel paths according to the determined priorities; and converting the IP packet to be forwarded into the packet of the IP protocol employed by the determined forwarding path, when the IP protocol employed by the determined forwarding path is different from the IP protocol employed by the IP packet to be forwarded.

* * * * *